United States Patent [19]

Tabler

[11] Patent Number: 4,485,910

[45] Date of Patent: Dec. 4, 1984

[54] CONTAINER HANDLING SYSTEM

[75] Inventor: Charles P. Tabler, Hamilton, Ohio

[73] Assignee: Buckhorn Material Handling Group Inc., Cincinnati, Ohio

[21] Appl. No.: 368,843

[22] Filed: Apr. 15, 1982

[51] Int. Cl.³ ............................................. B65G 13/00
[52] U.S. Cl. ....................................... 193/36; 414/286
[58] Field of Search .......................... 414/286; 198/485; 193/35 R, 35 SS, 36

[56] References Cited

U.S. PATENT DOCUMENTS

| | | | |
|---|---|---|---|
| 3,057,448 | 10/1962 | Kornylak | 414/286 X |
| 3,093,229 | 6/1963 | Scheidenhelm | 193/36 |
| 3,392,813 | 7/1968 | Trautmann | 193/36 |
| 3,904,053 | 9/1975 | Yatagai et al. | 414/417 |
| 4,068,751 | 1/1978 | Azzi | 193/36 |

FOREIGN PATENT DOCUMENTS 1382511 11/1964 France .

521191 7/1976 U.S.S.R. ........................ 193/35 R

OTHER PUBLICATIONS

Kingston-Warren Corporation Advertisement for Kingway Gravity Storage Systems.
Union Camp Engineered Systems Advertisement for Pallet Shrink-Wrap System, Jun. 1974.

Primary Examiner—Robert J. Spar
Assistant Examiner—Ken Muncy
Attorney, Agent, or Firm—Beal Law Offices

[57] ABSTRACT

A container handling system is provided for the conveyance of containers from one location to another. The system is able to handle palletized containers and operate as an order picking pallet return system. The manual operations involved in loading and unloading the containers with respect to one apparatus of the system are safeguarded from being conducted incorrectly, thereby enabling accident free use of the system under normal operation.

21 Claims, 9 Drawing Figures

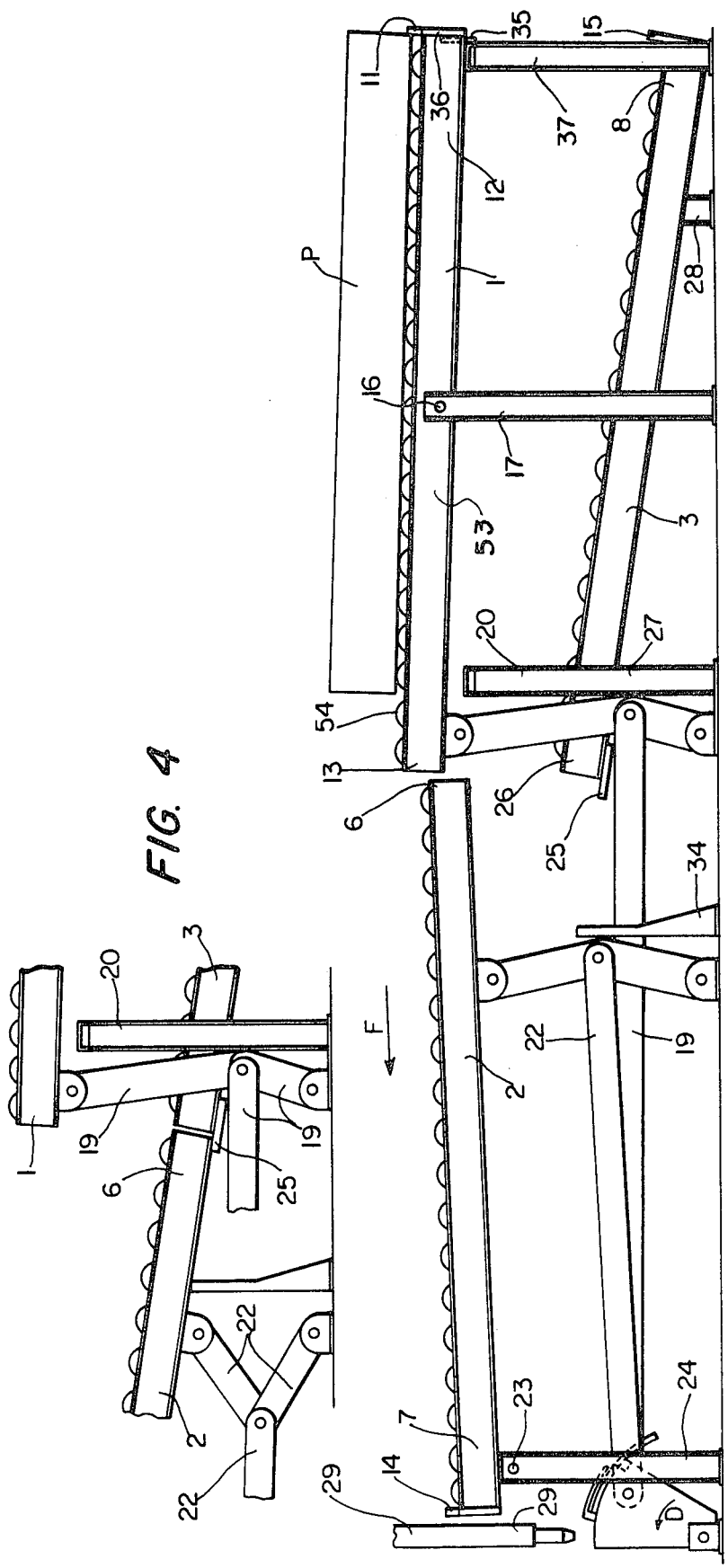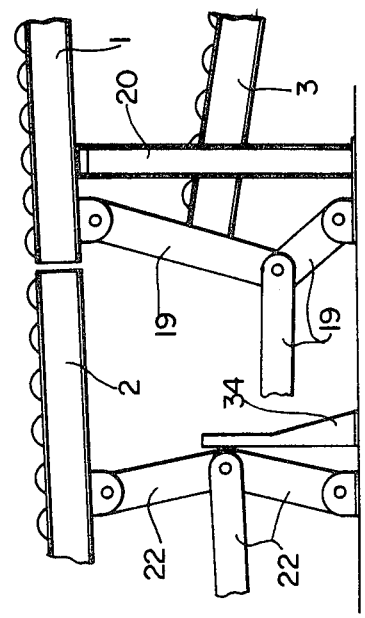

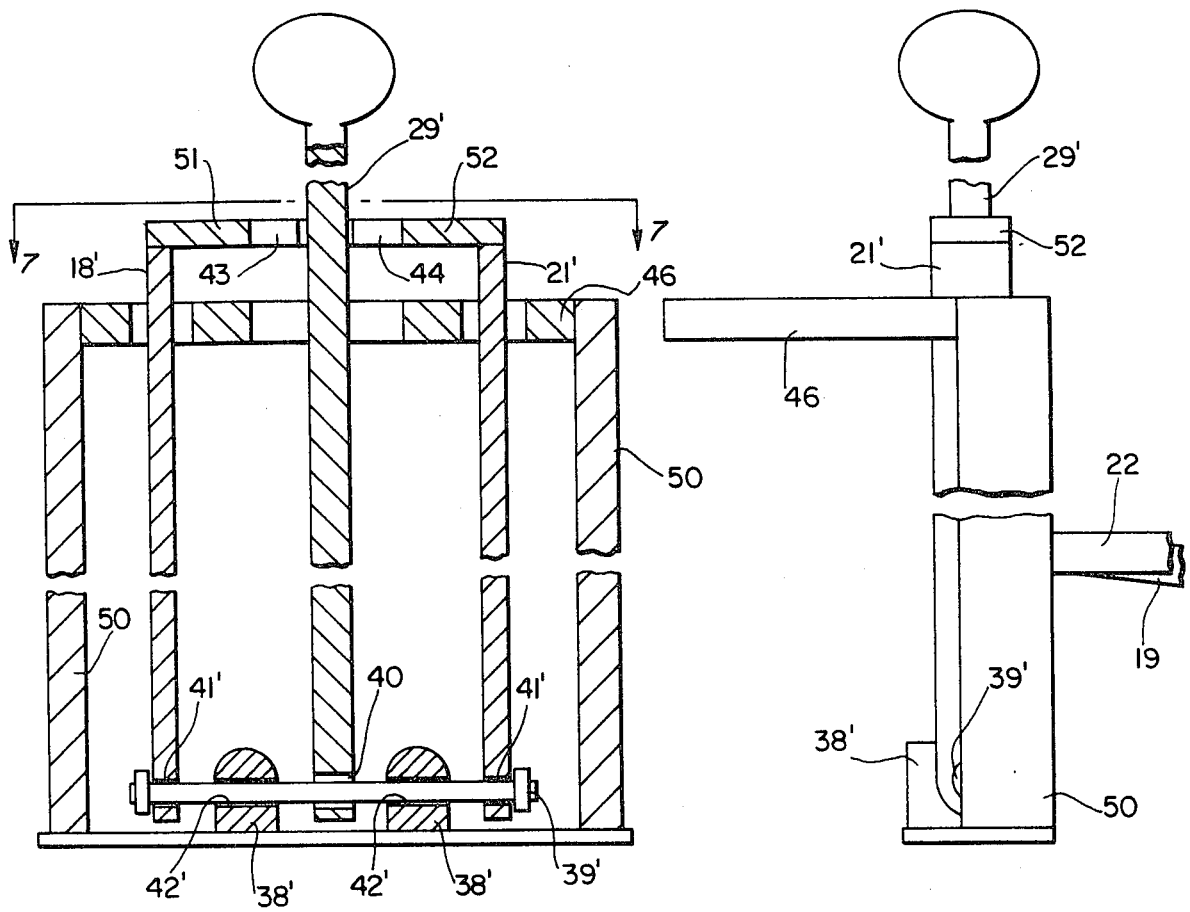
FIG. 6
FIG. 9
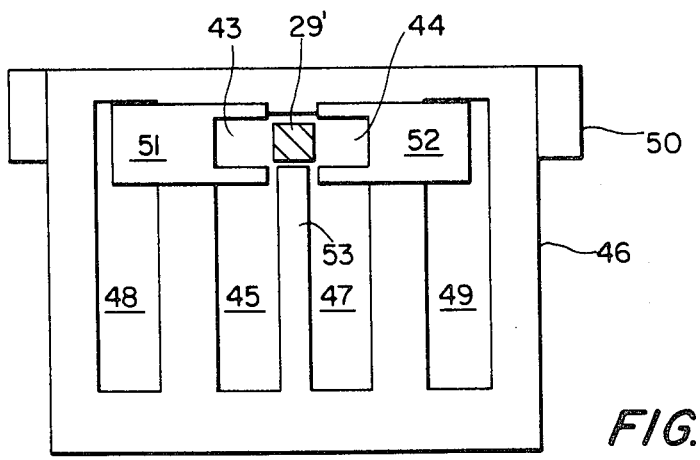
FIG. 7

CONTAINER HANDLING SYSTEM

BACKGROUND OF THE INVENTION

A. Field of the Invention

This invention relates to a system for handling containers. Containers, such as pallets, are conveyed from one location to another in material handling operations. This system is particularly adapted for handling palletized containers. An apparatus of the system is useful in an order picking system in which the contents of loaded pallets are removed, and the empty pallets returned to a location where they can be picked up.

B. Description of the Prior Art

This invention improves upon prior art devices which are mechanically complex and therefore subject to high manufacturing costs as well as extensive maintenance procedures. Additionally, the prior art devices are subject to the possibility of operator error which can cause container handling accidents that are not only dangerous to the operator but also not easily corrected for. This invention improves upon these prior art devices which are disclosed in U.S. Pat. Nos. 4,068,751, 3,392,813, and French Pat. No. 1,382,511.

SUMMARY OF THE INVENTION

It is an object of the present invention to improve upon the prior art devices by providing an apparatus within an container handling system which is of a simple mechanical construction. It is of further object of this invention to provide an apparatus which is prevented from being operated in a manner that can cause container handling accidents and possible bodily harm to the operator.

It is an object of this invention to provide an apparatus within a container handling system for the forwarding of loaded containers and the returning of empty containers.

Further it is an object of this invention to enable an operator to control the forwarding and returning of the containers from one location.

BRIEF DESCRIPTION OF THE DRAWINGS

FIG. 2 is a detailed side elevational view of another embodiment of the apparatus enclosed within block A of FIG. 1.

FIG. 3 is a sectional side elevation view of the apparatus shown in FIG. 2 in the loaded pallet forwarding position.

FIG. 4 is a sectional side elevation view of the apparatus shown in FIG. 2 in the empty pallet returning position.

FIG. 6 is a front sectional view of another embodiment of the storage picking rail operating levers.

FIG. 7 is a top plan view partly in section of the embodiment shown in FIG. 6 taken substantially upon a plane passing along section line 7—7.

FIG. 9 is a side elevational view of the operating levers embodied in FIG. 6.

DETAILED DESCRIPTION OF THE DRAWINGS

Figure 1:
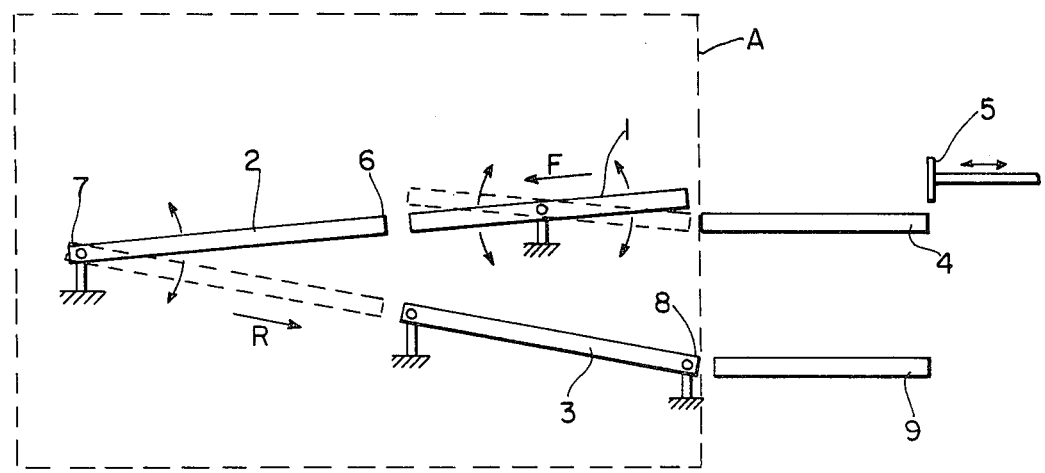
FIG. 1 is an overall diagram of the container handling system of the invention.

In FIG. 1 the components of the container handling system are shown. The system comprises a storage rail 1, a picking or receiving rail 2, and a return rail 3. These rails are of the type which are normally used in the gravity conveying of containers. Each rail, may for example, comprise two side beams having interconnected between them axle rollers journalled to the beams at their ends; or, by the way of another example, two side beams having cross beams connected between each other, the cross beams having roller wheels mounted for free rotational movement thereon. The rail could also comprise two side beams having a flat plate of metal extending between them so as to form a skid upon which the containers would slide. One type of rail is not particularly favored over another type of rail so long as the containers are conveyed from one end of the rail to the other end of the rail.

The storage rail as shown in FIG. 1 may be associated with a container feeding conveyor 4 for feeding containers onto the storage rail. The containers may be pushed from the feed conveyor 4 by any conventional automatic pushing apparatus such as designated at 5.

The storage rail 1 is adapted to move between a container receiving and storage position, which is designated by the dash lines shown in FIG. 1, and a container forwarding position which is indicated by the solid lines in FIG. 1. The receiving and storage position of rail 1 will be hereafter referred to as only the receiving position of rail 1. Corresponding with the container forwarding position of storage rail 1 is a positive slope orientation. Corresponding with the container receiving and storage position of storage rail 1 is a negative slope orientation. The change in slope orientation of the storage rail provides for controlling the advancing of containers on storage rail 1. The slope orientation of the storage rail in the container receiving and storage position could be generally level such that the force of gravity acts normal to the plane of the storage rail. In the case where a container is on the storage rail and the storage rail is level, the movement of a container in a longitudinal forwarding direction as indicated by the arrow F in FIGS. 1 and 2 would still be controlled by changing the slope orientation of the storage rail to the positive slope orientation corresponding with the storage rail being in the container forwarding direction.

The picking rail 2 has a container receiving end 6 for receiving a container being conveyed from storage rail 1, and a container handling end 7. When the slope orientation of storage rail 1 is changed from the negative slope orientation corresponding with the receiving position to the positive slope orientation corresponding with the container forwarding position, a container will begin to convey in the longitudinal direction shown by the arrow F. The container receiving end 6 of the picking rail will be in position adjacent to the storage rail for receiving the container being conveyed. The container will continue to be conveyed to the handling end 7. At this point the container may be removed from the picking rail and deposited at another location, not shown.

The system shown in FIG. 1 is well suited for the handling of containers which are filled with contents to be emptied at the handling end 7 of the picking rail 2. For handling these types of containers, the picking rail is adapted to be pivoted between two positions, a container receiving position indicated by the solid lines and a container returning position indicated by the dashed lines. In the container returning position rail 2 is oriented such that the container receiving end 6 is adjacent the return rail 3. In this embodiment the container receiving end 6 is also a container returning end. The empty container, emptied at container handling end 7, then advances longitudinally in the direction of arrow R toward the return rail 3.

The return rail 3 may be fixedly mounted at an incline equal to the slope of the picking rail 2 when the picking rail is in the empty container returning position. Alternatively the return rail may be mounted at an inclination less than equal to the slope of the picking rail or the return rail may be mounted substantially level so long as the container being conveyed is received by the return rail and conveyed to the temporary storage end 8. The container may then continue to advance beyond the end of the return rail to an empty container conveyor generally designated 9.

FIG. 2 shows another embodiment of the portion of the container handling system designated by the block A. This apparatus is particularly useful in the handling of palletized containers.

The storage rail shown in FIG. 2 comprises two side members 53, only one of which can be seen in FIG. 2. Roller wheels 54 extend across the surface of the rail. The wheels are mounted on indivdual axles and allowed to freely rotate about the axles. The picking rail 2 and return rail 3 are similarly constructed, however many constructions allowing for the conveying of the containers across the surface of the rails are suitable as herein already described.

In FIG. 2 the storage rail 1 is positioned for receiving a loaded pallet P. Loaded pallets may be placed on the storage rail 1 by a fork lift. The loaded pallet P abuts a pallet stop 11 at the receiving end 12 of the storage rail. A pallet stop would not be necessary at receiving end 12 of the storage rail if the rail is positioned level or generally without enough positive slope or negative slope to affect movement of a pallet in either the forwarding direction indicated by the arrow F or in the opposite direction once the pallet is loaded onto the storage rail. No pallet stops are provided at the loaded pallet forwarding end 13 of the storage rail since the forward conveying of the pallet is controlled by the changing of the slope orientation of the storage rail.

As earlier stated in the description of FIG. 1 the picking rail 2 has a container receiving end 6 which is adapted for receiving pallets conveyed from the storage rail to the picking rail. The receiving end 6 is also a returning end when the picking rail 2 is in the empty pallet return position as shown in FIG. 4 and as discussed with respect to FIG. 1. A pallet stop 14 is located at the container handling end 7 of the picking rail 2. In the handling of palletized contents the container handling end 7 is more specifically designated an order picking end. For example, when a pallet P is on picking rail 2 and the end of the pallet is abutting pallet stop 14 an operator may remove the contents from the pallet and place the contents at a location not shown. A pallet stop 14 would not be necessary however if the rail surface of picking rail 2 were a skid or some other frictional surface such that a container advancing in the direction of arrow F from the storage rail to the picking rail would stop at a location along the picking rail before it conveyed beyond the handling end 7.

The return rail 3 shown in FIG. 2 has an empty pallet receiving end 26 and is fixedly mounted at an incline equal to the incline of the picking rail 2 when the picking rail is in the empty pallet returning position. Rail 3 is mounted at end 8 by return rail support 28 and at end 26 by loaded pallet forwarding end support 20 generally at 27. A pallet stop 15 is located at the temporary storage end 8 of the return rail 3.

Pallet stop means 11, 14 and 15 may comprise a plate of metal welded to the end of the rail at which the stop is located. Of course the stop may extend continuously the full width of the rail, extend part way the width of the rail, or extend only along one portion of the rail. The stops 11, 14 and 15 need only to extend above the surface of the rail such that the pallet abuts the stop when hitting it and does not continue to advance over it.

Figure 5:
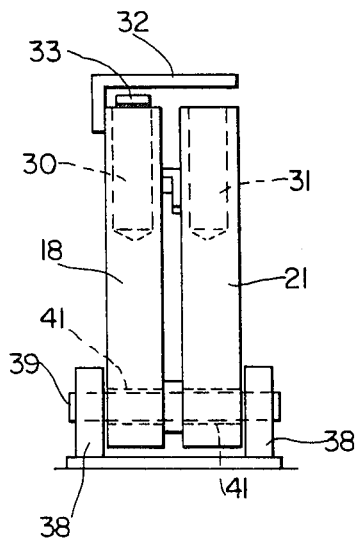
FIG. 5 is a front elevational view of the storage and picking rail operating levers.

When a pallet is first loaded onto the storage rail 1 of FIG. 3 positioned in the container receiving position, it is prevented from forwarding to the picking rail 2 by means of the negative slope orientation or level orientation of the storage rail as discussed in the description of FIG. 1. The storage rail 1 is mounted for rotational movement about a horizontal axis located at the midway point between the receiving and loading ends by an axle 16 fixed to the storage rail and journalled to and supported by a pair of storage rail supports 17, only one of which can be seen in FIG. 2, in the conventional manner. The storage rail is moved between the receiving and forwarding positions by means of a storage rail operating lever 18, and a storage rail toggle linkage assembly 19. The storage rail is locked in the receiving position when the lever 18 shown in FIG. 5, is in the upright position as shown in FIG. 2 and, the storage rail linkage assembly 19 is over center and abutting a stop such as the pair of pallet forwarding end supports 20 only one of which is shown in FIG. 2. The supports 20 support the storage rail 1 at the loaded pallet forwarding end 13 when the storage rail is in the loaded pallet forwarding position.

The picking rail, when in the loaded pallet receiving position, is properly aligned with the storage rail so that it may receive a pallet being conveyed. Movement of the picking rail 2 between the loaded pallet receiving position and the empty pallet returning position is achieved through a picking rail lever 21 shown in FIG. 5 and a picking rail toggle linkage assembly 22. The picking rail is pivoted at its order picking end 7 about a horizontal axis on axle 23 fixed to the picking rail and journaled at it's opposite ends in a conventional manner to a pair of picking rail supports 24 only one of which can be seen in FIG. 2. The picking rail is locked in the receiving position when the lever 21 is in the upright position as shown in FIG. 2 and, the picking rail linkage assembly 22 is over center and abutting a stop 34.

With reference to FIG. 5, levers 18 and 21 are mounted for pivotal movement by a bolt 39 passing through lever bores 41, and supported by upstanding bolt supports 38. The levers are able to be rotated freely, however are prevented substantially from side to side movement by close tolerances between the bolt diameter and lever bores.

Levers 18 and 21 are mechanically restricted from being operating out of sequence such that pallet handling accidents due to operator error are reduced to a minimum. The levers 18 and 21 operate from the upright position and in both of two different embodiments are actuated by a single handle. Movement of the linkage 19 from its over center position is achieved by drawing back lever 18 in the direction of arrow D as seen in FIG. 2. Similarly movement of linkage 22 from its over center position by lever 21 is achieved by drawing back lever 21 in the direction of arrow D. Restoring either of levers 18 or 21 to their respective upright positions locks the respective linkages 19 and 22 in their respective upright positions. Additionally, the levers are restricted such that both cannot be operated, drawn back or returned to their upright positions, simultaneously when operated in the normal manner by use of the handle provided for operation of the levers.

The sequence of steps followed in operating the apparatus of FIG. 2 involves first receiving a pallet on storage rail 1 when lever 18 is in its upright position and therefore the storage rail is in the loaded pallet receiving position. The lever 18 is drawn back in the direction of arrow D to change the slope orientation of the storage rail to advance the pallet on storage rail 1 longitudinally forward in the direction of arrow F. The picking rail operating lever 21 is prevented from moving the picking rail after the storage rail operating lever 18 begins to operate the storage rail 1 in movement from the pallet receiving position to the pallet forwarding position. The picking rail, now locked in its upright position receives the pallet being conveyed from the storage rail 1. The pallet advances to the handling end 7 of the picking rail where it is stopped by pallet stop 14 or by frictional engagement with the surface of the picking rail. At this point the contents of the pallet are removed to another location not shown. When the empty pallet is desired to be returned to the return rail 3 the picking rail is pivoted to the empty pallet returning position such that end 6 is lowered to be aligned with rail 3, but not until the operating lever 18 is returned to its upright position and therefore the storage rail 1 returned to its position of negative or level slope orientation for receiving loaded pallets. Once the storage rail lever 18 has been returned to its upright position, lever 21 is available to operate picking rail toggle linkage 22 to lower the picking rail from the loaded pallet receiving position to the empty pallet returning position. Exact alignment of the picking rail 2 with the return rail 3 is provided by the picking rail alignment stop 25. Lever 18 is prevented from moving after lever 21 is operated and begins to move the order picking rail to the empty pallet returning position.

Because each of the operating levers can only be operated from a position where both are in the uright position, a loaded pallet can not be forwarded from the storage rail 1 to the picking rail 2 when the picking rail is in the empty pallet returning position.

Figure 8:
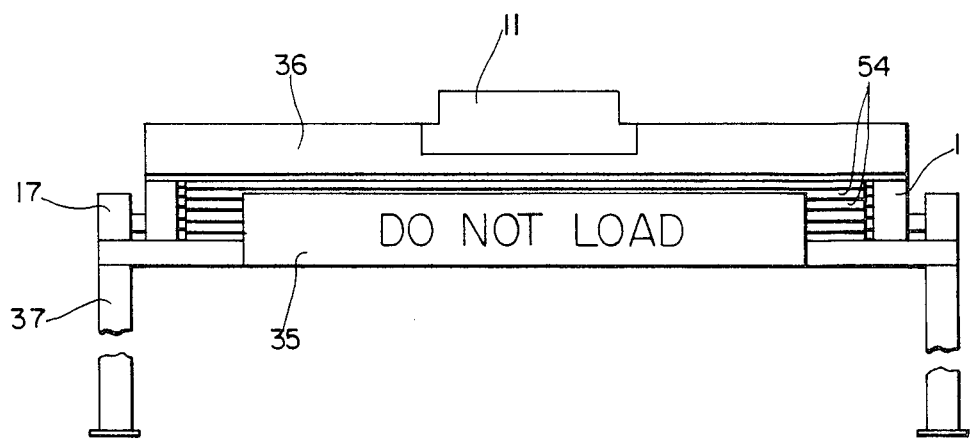
FIG. 8 is a partial end elevational view of the apparatus shown in FIG. 2.

When the apparatus of FIG. 2 is used in an order picking system and pallets are placed on storage rail 1 from a fork lift truck, the operator of the fork lift is instructed not to load a pallet onto the storage rail when the storage rail is in the pallet forwarding position. To aid the operator in determining the position of the storage rail, a "Do Not Load" sign 35 is viable from the storage rail loading end of the apparatus as can be seen in FIG. 8. Sign 35 is hidden from view by the storage rail cross beam 36 which is at end 12 of the storage rail as can be seen in FIG. 2. Further, the sign is mounted to the storage rail supporting posts 37 which support the storage rail when the storage rail is in the pallet storage and receiving position. Should a fork lift operator place a loaded pallet on the storage rail 1 when it is in its pallet forwarding position the pallet would simply forward onto the picking rail where it would stop by frictional engagement with the surface of the picking rail or by means of pallet stop 14. As stated, the picking rail would necessarily be in the loaded pallet receiving position. If a pallet were, however already on the picking rail the loaded pallet placed on the storage rail in error would advance until it abutted with the pallet already on the picking rail. This type of accident, although not prevented by the restricted movement of the levers may be easily corrected by returning the storage rail to its loaded pallet receiving position thereby changing the slope orientation of the storage rail in error to advance opposite the direction of the arrow F until it abutts pallet stop 11.

In FIG. 3 the storage rail is shown in the pallet forwarding position, with the storage rail resting on storage forwarding end support 20. Linkage assembly 22 is shown in the over center position abutting stop 34. In the position shown in FIG. 3 the storage rail is in position for forwarding a loaded pallet to the picking rail which is in position for receiving a loaded pallet.

In FIG. 4 the picking rail is shown in the empty pallet returning position. End 6 of rail 2 is shown resting on alignment stop 25. The linkage 19 is in the over center position abutting storage rail forwarding end support 20, while linkage 22 is in the position achieved when lever 21 is drawn back in the direction of arrow D.

One embodiment for restricting the movement of the storage rail and picking rail operating levers is shown in FIGS. 2 and 5. In this embodiment, the levers are operated by handle 29 which is adapted to be received within one of two operating lever bores 30 and 31 located in levers 18 and 21 respectively. When levers 18 and 21 are in the upright position handle 29 may be inserted within either of bores 30 and 31. Mounted on each of levers 18 and 21 are a storage rail bore shroud 32 and a picking rail bore shroud 33, as can be seen in FIG. 5. The placement of the shroud is such that when lever 21 is drawn back in the direction of arrow D the picking rail shroud 33 covers bore 30, preventing the insertion of handle 29 and therefore preventing the operation of lever 18 in the normal manner as described. Similarly when the lever 18 is drawn backward in the direction of arrow D, shroud 32 covers bore 31 preventing insertion of the handle 29 into bore 31 and therefore preventing the drawing back of lever 21 in the normal manner as described.

Another embodiment for restricting movement of the storage rail and picking rail operating levers is shown in FIGS. 6, 7, and 9. In this embodiment the levers are operated by handle 29' which is anchored by bolt 39' through lever bore 40 as can be seen in FIG. 6. Operating levers 18' and 21' operate storage rail linkage assembly 19 and picking rail linkage assembly 22 respectively. The levers 18' and 21' are mounted for pivotal movement at the base of each lever by bolt 39' passing through respetive lever mounting bores 41'. The bolt 39' passes through bores 42' in upstanding bolt supports 38'. A close tolerance between the diameter of the bolt 39' and the bores 40, 41' and 42' is not necessary as herein will be described. Actually it is preferred that the diameter of bore 40 be greater than the diameter of bolt 39' so that the handle 29' will be able to move from side to side such that on the one side it engages with a cut-out portion 43 of lever 18' and on the other side it engages with a cut-out portion 44 of lever 21'. A guide plate 46 restricts the movement of handle 29' to move only within two guideways 45 and 47. Guideway 45 allows lever 18' to be pulled backward while maintaining engagement of handle 29' within cut-out 43. Similarly, guideway 47 allows lever 21' to be pulled back while maintaining engagement of handle 29' within cut-out 44. Further guideways 48 and 49 are provided for supporting levers 18' and 21' against side to side movement. Vertical guide plate supports 50 provide for supporting guide plate 46 just vertically beneath handle engaging portions 51 and 52 of the storage and picking rail operating levers 18' and 21' respectively. The portion 53 of guide plate 46 which extends between guideways 45 and 47 prevents handle 29' from being pulled backward while in possible engagement with both cut-out portions 43 and 44. Additionally as can be seen in FIG. 6 levers 18' and 21' are of substantially the same height such that no overlapping of engagement portions 51 and 52 when levers 18' and 21' are urged toward each other.

In each of the lever operating assembly embodiments the components are dimensioned to allow free travel of the levers in the directions necessary to actuate the movement of the storage and picking rails as has been herein described.

Obviously, many modifications and variations of the present invention are possible in light of the above teachings. Thus, it is to be understood that within the scope of the appended claims, the invention may be practiced otherwise than as specifically described.

I claim:

1. A pallet handling apparatus for forwarding pallets in a longitudinal forwarding direction and returning pallets in a longitudinal returning direction, comprising:
    rail means for the gravity conveying of pallets between different pallet handling positions;
    said rail means including a pallet storage rail, and order picking rail, and an empty pallet return rail;
    stationary means for supporting said pallet storage rail, said order picking rail and said empty pallet return rail;
    said pallet storage rail having longitudinally opposed stored pallet receiving and loaded pallet forwarding ends;
    said pallet storage rail being mounted upon said stationary means at a stationary intermediate point between said pallet receiving and pallet forwarding ends, for pivotal movement about said stationary intermediate point between a loaded pallet forwarding position having a positive slope orientation corresponding with said longitudinal forwarding direction and a stored pallet receiving position having a negative slope orientation relative to said positive slope orientation;
    a first pallet stop means at said stored pallet receiving end of said pallet storage rail for preventing a pallet from moving off said pallet storage rail when said pallet storage rail is in said negative slope orientation;
    said order picking rail having longitudinally opposed ends, one of said ends being an order picking end and, the other of said ends being a loaded pallet receiving and empty pallet returning end;
    said order picking rail being mounted upon said stationary means at a point of rotation stationary relative to said stationary means for pivotal movement about said point of rotation whereby said receiving and returning end can move between a loaded pallet receiving position and an empty pallet returning position;
    storage rail operating means operable to move said pallet storage rail between said storage pallet receiving position and said loaded pallet forwarding position to produce a change in said slope orientation for moving a loaded pallet in said longitudinal forwarding direction from said stored pallet receiving position to said loaded pallet forwarding position;
    said order picking rail being oriented relative to said storage rail such that when a loaded pallet is received at said loaded pallet receiving position the pallet continues to advance in said longitudinal forwarding direction to said order picking end;
    second pallet stop means at said order picking end for preventing a pallet from advancing off said order picking rail in said longitudinal forwarding direction;
    said empty pallet return rail having longitudinally opposed empty pallet receiving and temporary storing ends;
    said empty pallet return rail having a third pallet stop means at said storing end for stopping a pallet from advancing in said longitudinal returning direction;
    picking rail operating means operable to move said order picking rail between said loaded pallet receiving position and said empty pallet returning position such that when a loaded pallet is on said storage rail and said storage rail is in said loaded pallet forwarding position, the loaded pallet will first be received by said pallet receiving and empty pallet returning end, will secondly be advanced in said longitudinal forwarding direction to said order picking end where the pallet is to be emptied, then thirdly, as an empty pallet, be advanced in said longitudinal returning direction to said loaded pallet receiving and empty pallet returning end and, fourthly be advanced to said empty pallet return rail;
    said empty pallet return rail being stationarily mounted upon said supporting means and oriented relative to said order picking rail such that when an empty pallet is received from said order picking rail at said empty pallet receiving end, the empty pallet advances in said longitudinal returning direction to said empty pallet storing end.

2. The apparatus according to claim 1 wherein said picking rail operating means and said storage rail operating means further comprise;
    restricting means for preventing said picking rail operating means from moving said picking rail after said storage rail operating means begins to move said storage rail from said stored pallet receiving position to said loaded pallet forwarding position such that a loaded pallet is prevented from advancing in said longitudinal forwarding direction from said storage rail to said order picking rail when said order picking rail is in said empty pallet returning position; and, for preventing said storage rail operating means from moving said storage rail after said order picking rail operating means begins to move said order picking rail to said empty pallet returning position such that a loaded pallet on said storage rail when said storage rail is in said stored pallet receiving position could not advance when said order picking rail is not in said loaded pallet receiving position.

3. The apparatus according to claim 2 wherein said picking rail operating means and said storage rail operating means further, comprise:

a storage rail operating lever mounted for pivotal movement;

a picking rail operating lever mounted for pivotal movement;

a storage rail linkage assembly connecting said storage rail lever to said pallet storage rail for transferring the pivotal movement of said storage rail lever to said storage rail for effecting pivotal movement of said storage rail; and, a picking rail linkage assembly connecting said picking rail lever to said order picking rail for transferring the pivotal movement of said picking rail lever to said picking rail for effecting the pivotal movement of said picking rail.

4. The apparatus according to claim 3, further including:

a single operating handle;

a bore in said picking rail lever for receiving said handle;

a bore in said storage rail lever for receiving said handle;

said restricting means comprising a picking rail shroud which covers said bore of said storge rail lever when said picking rail lever is actuating said picking rail linkage assembly and a storage rail shroud which covers said bore of said picking rail lever when said storage rail operating lever actuates said storage rail linkage assembly.

5. The apparatus according to claim 3 wherein said picking rail operating means and said storage rail operating means further comprise:

a single handle for use with said picking and said storage rail operating levers;

a handle mounting means for allowing said handle to be moved between said storage rail operating lever and said picking rail operating lever such that said handle is available to singly interconnect with either said storage rail operating lever or said picking rail operating lever but not both said levers simultaneously.

6. The apparatus according to claim 1 wherein said rail means further comprises:

roller wheels mounted for free rotational movement about an axis planer with said rails such that said storage rail has a roller surface for receiving and conveying a pallet to said pallet forwarding end;

said picking rail has a roller surface for receiving and conveying a pallet to said order picking end and thereafter conveying a pallet to said empty pallet returning end; and, said return rail has a roller surface for receiving and conveying a pallet to said empty pallet storing end.

7. The apparatus according to claim 1 further including:

visual indicating means mounted on said stationary means at said stored pallet receiving end of said pallet storage rail;

said visual indicating means being visible to an observer looking at said stored pallet receiving end of said pallet storage rail; and said visual indicating means further being mounted such that said stored pallet receiving end of said pallet storage rail hides the view of said visual indicating means when said pallet storage rail is in said stored pallet receiving position and said pallet storage rail exposes said visual indicating means to an observer when said pallet storage rail is in said loaded pallet forwarding position such that said visual indicating means indicates that a pallet should not be loaded onto said pallet storage rail when said pallet storage rail is in said loaded pallet forwarding position.

8. A pallet handling apparatus for forwarding pallets in a longitudinal forwarding direction and returning pallets in a longitudinal returning direction, comprising:

rail means for the gravity conveying of pallets between different pallet handling positions;

said rail means including a pallet storage rail, and order picking rail, and an empty pallet return rail;

stationary means for supporting said pallet storage rail, said order picking rail and said empty pallet return rail;

said pallet storage rail having longitudinally opposed stored pallet receiving and loaded pallet forwarding ends;

said pallet storage rail being mounted upon said stationary means at a stationary intermediate point between said pallet receiving and pallet forwarding ends, for pivotal movement about said stationary intermediate point between a loaded pallet forwarding position having a positive slope orientation corresponding with said longitudinal forwarding direction and a stored pallet receiving position having a level slope orientation relative to said positive slope orientation;

a first pallet stop means at said stored pallet receiving end of said pallet storage rail for preventing a pallet from moving off said pallet storage rail when said pallet storage rail is in said negative slope orientation;

said order picking rail having longitudinally opposed ends, one of said ends being an order picking end and, the other of said ends being a loaded pallet receiving and empty pallet returning end;

said order picking rail being mounted upon said stationary means at a point of rotation stationary relative to said stationary means for pivotal movement about said point of rotation whereby said receiving and returning end can move between a loaded pallet receiving position and an empty pallet returning position;

storage rail operating means operable to move said pallet storage rail between said storage pallet receiving position and said loaded pallet forwarding position to produce a change in said slope orientation for moving a loaded pallet in said longitudinal forwarding direction from said stored pallet receiving position to said loaded pallet forwarding position;

said order picking rail being oriented relative to said storage rail such that when a loaded pallet is received at said loaded pallet receiving position the pallet continues to advance in said longitudinal forwarding direction to said order picking end;

second pallet stop means at said order picking end for preventing a pallet from advancing off said order picking rail in said longitudinal forwarding direction;

said empty pallet return rail having longitudinally opposed empty pallet receiving and temporary storing ends;

said empty pallet return rail having a third pallet stop means at said storing end for stopping a pallet from advancing in said longitudinal returning direction;

picking rail operating means operable to move said order picking rail between said loaded pallet receiving position and said empty pallet returning position such that when a loaded pallet is on said storage rail and said storage rail is in said loaded pallet forwarding position, the loaded pallet will first be received by said pallet receiving and empty pallet returning end, will secondly be advanced in said longitudinal forwarding direction to said order picking end where the pallet is to be emptied, then thirdly, as an empty pallet, be advanced in said longitudinal returning direction to said loaded pallet receiving and empty pallet returning end and fourthly be advanced to said empty pallet return raill;

said empty pallet return rail being stationarily mounted upon said supporting means and oriented relative to said order picking rail such that when an empty pallet is received from said order picking rail at said empty pallet receiving end, the empty pallet advances in said longitudinal returning direction to said empty pallet storing end.

9. The apparatus according to claim 8 further including:

visual indicating means mounted on said stationary means at said stored pallet receiving end of said pallet storage rail;

said visual indicating means being visible to an observer looking at said stored pallet receiving end of said pallet storage rail; and said visual indicating means further being mounted such that said stored pallet receiving end of said pallet storage rail hides the view of said visual indicating means when said pallet storage rail is in said stored pallet receiving position and said pallet storage rail exposes said visual indicating means to an observer when said pallet storage rail is in said loaded pallet forwarding position such that said visual indicating means indicates that a pallet should not be loaded onto said pallet storage rail when said pallet storage rail is in said loaded pallet forwarding position.

10. A container handling apparatus for forwarding containers in a longitudinal forwarding direction and returning containers in a longitudinal returning direction, comprising:

rail means for the gravity conveying of containers between different container handling positions;

said rail means including a first rail, a second rail, and a third rail;

stationary means for supporting said first rail, said second rail, and said third rail;

said first rail having longitudinally opposed container receiving and container forwarding ends;

said first rail being mounted upon said stationary means at a stationary intermediate point between said container receiving and container forwarding ends, for pivotal movement about said stationary intermediate point between a container forwarding position having a positive slope orientation corresponding with said longitudinal forwarding direction and a container receiving position having a negative slope orientation relative to said positive slope orientation;

said second rail having longitudinally opposed ends, one of said ends being a container handling end and, the other of said ends being a container receiving and returning end;

said second rail being mounted upon said stationary means at a point of rotation stationary relative to said stationary means for pivotal movement about said point of rotation whereby said receiving and returning end can move between a container receiving position and a container returning position;

means for operating said first rail to move said first rail between said container receiving position and said container forwarding position to produce a change in said slope orientation for moving a container in said longitudinal forwarding direction from said container receiving position to said container forwarding position;

said second rail being oriented relative to said first rail such that when a container is received at said container receiving position the container continues to advance in said longitudinal forwarding direction to said container handling end;

said third rail having longitudinally opposed container receiving and temporary storing ends;

means for operating said second rail to move said second rail between said container receiving position and said container returning position such that when a container is on said first rail and said first rail is in said container forwarding position, the container will firstly be received by said container receiving and container returning end of said second rail, will secondly be advanced in said longitudinal forwarding direction to said container handling end, then thirdly be advanced in said longitudinal returning direction to said container receiving and container returning end of said second rail and fourthly, be advanced to said third rail;

said third rail being stationarily mounted upon said supporting means and oriented relative to said second rail such that when a container is received from said second rail at said container receiving end, the container advances in said longitudinal returning direction to said temporary storing end.

11. The apparatus according to claim 10 further comprising:

restricting means for preventing said means for operating said second rail from moving said second rail after said means for operating said first rail begins to move said first rail from said container receiving position to said container forwarding position such that a container is prevented from advancing in said longitudinal forwarding direction from said first rail to said second rail when said second rail is in said container returning position, and for preventing said means for operating said first rail from moving said first rail after said means for moving said second rail begins to move said second rail to said container returning position such that a container on said first rail when said first rail is in said container receiving position could not advance when said second rail is not in said container receiving position.

12. The apparatus according to claim 11 wherein said means for operating said second rail and said means for operating said first rail further comprise:

a first rail operating lever mounted for pivotal movement;

a second rail operating lever mounted for pivotal movement;

a first rail linkage assembly connecting said first rail lever to said first rail for transferring the pivotal movement of said first rail lever to said first rail for effecting pivotal movement of said first rail; and a second rail linkage assembly connecting said second rail lever to said second rail for transferring the pivotal movement of said second rail lever to said second rail for effecting the pivotal movement of said second rail.

13. The apparatus according to claim 12, further including:
a single operating handle;
a bore in said second rail lever for receiving said handle;
a bore in said first rail lever for receiving said handle;
said restricting means comprising a second rail shroud that covers said bore of said first rail lever when said second rail lever is actuating said second rail linkage assembly and a first rail shroud that covers said bore of said second rail lever when said first rail operating lever actuates said first rail linkage assembly.

14. The apparatus according to claim 12, wherein said means for operating said second rail and said means for operating said first rail further comprises:
a single handle for use with said second rail and said first rail operating levers;
a handle mounting means for allowing said handle to be moved between said first rail operating lever and said second rail operating lever such that said handle is available to singly interconnect with either said first rail operating lever or said second rail operating lever but not both said levers simultaneously.

15. The apparatus according to claim 10 further including:
visual indicating means mounted on said stationary means at said container receiving end of said first rail;
said visual indicating means being visible to an observer looking at said container receiving end of said first rail; and
said visual indicating means further being means such that said container receiving end of said first rail hides the view of said visual indicating means when said first rail is in said container receiving position and said first rail exposes said visual indicating means to an observer when said first rail is in said container forwarding position such that said visual indicating means indicates that a container should not be loaded onto said first rail when said first rail is in said container forwarding position.

16. A container handling apparatus for forwarding containers in a longitudinal forwarding direction and returning containers in a longitudinal returning direction, comprising:
rail means for the gravity conveying of containers between different container handling positions;
said rail means including a first rail, a second rail, and a third rail;
stationary means for supporting said first rail, said second rail, and said third rail;
said first rail having longitudinally opposed container receiving and container forwarding ends;
said first rail being mounted upon said stationary means at a stationary intermediate point between said container receiving and container forwarding ends, for pivotal movement about said stationary intermediate point between a container forwarding position having a positive slope orientation corresponding with said longitudinal forwarding direction and a container receiving position having a level slope orientation relative to said positive slope orientation;
said second rail having longitudinally opposed ends, one of said ends being a container handling end and, the other of said ends being a container receiving and returning end;
said second rail being mounted upon said stationary means at a point of rotation stationary relative to said stationary means for pivotal movement about said point of rotation whereby said receiving and returning end can move between a container receiving position and a container returning position;
means for operating said first rail to move said first rail between said container receiving position and said container forwarding position to produce a change in said slope orientation for moving a container in said longitudinal forwarding direction from said container receiving position to said container forwarding position;
said second rail being oriented relative to said first rail such that when a container is received at said container receiving position the container continues to advance in said longitudinal forwarding direction to said container handling end;
said third rail having longitudinally opposed container receiving and temporary storing ends;
means for operating said second rail to move said second rail between said container receiving position and said container returning position such that when a container is on said first rail and said first rail is in said container forwarding position, the container will firstly be received by said container receiving and container returning end of said second rail, will secondly be advanced in said longitudinal forwarding direction to said container handling end, then thirdly, be advanced in said longitudinal returning direction to said container receiving and container returning end of said second rail and fourthly, be advanced to said third rail;
said third rail being stationarily mounted upon said supporting means and oriented relative to said second rail such that when a container is received from said second rail at said container receiving end, the container advances in said longitudinal returning direction to said temporary storing end.

17. The apparatus according to claim 16, further comprising:
restricting means for preventing said means for operating said second rail from moving said second rail after said means for operating said first rail begins to move said first rail from said container receiving position to said container forwarding position such that a container is prevented from advancing in said longitudinal forwarding direction from said first rail to said second rail when said second rail is in said container returning position, and
for preventing said means for operating said first rail from moving said first rail after said means for moving said second rail begins to move said second rail to said container returning position such that a container on said first rail when said first rail is in said container receiving position could not advance when said second rail is not in said container receiving position.

18. The apparatus according to claim 17 wherein said means for operating said second rail and said means for operating said first rail further comprise:

a first rail operating lever mounted for pivotal movement;

a second rail operating lever mounted for pivotal movement;

a first rail linkage assembly connecting said first rail lever to said first rail for transferring the pivotal movement of said first rail lever to said first rail for effecting pivotal movement of said first rail; and a second rail linkage assembly connecting said second rail lever to said second rail for transferring the pivotal movement of said second rail lever to said second rail for effecting the pivotal movement of said second rail.

19. The apparatus according to claim 18, further including:

a single operating handle;

a bore in said second rail lever for receiving said handle;

a bore in said first rail lever for receiving said handle;

said restricting means comprising a second rail shroud that covers said bore of said first rail lever when said second rail lever is actuating said second rail linkage assembly and a first rail shroud that covers said bore of said second rail lever when said first rail operating lever actuates said first rail linkage assembly.

20. The apparatus according to claim 18, wherein said means for operating said second rail and said means for operating said first rail further comprise:

a single handle for use with said second rail and said first rail operating levers; and a handle mounting means for allowing said handle to be moved between said first rail operating lever and said second rail operating lever such that said handle is available to singly interconnect with either said first rail operating lever or said second rail operating lever but not both said levers simultaneously.

21. The apparatus according to claim 16, further including:

visual indicating means mounted on said stationary means at said container receiving end of said first rail;

said visual indicating means being visible to an observer looking at said container receiving end of said first rail; and said visual indicating means further being mounted such that said container receiving end of said first rail hides the view of said visual indicating means when said first rail is in said container receiving position and said first rail exposes said visual indicating means to an observer when said first rail is in said container forwarding position such that said visual indicating means indicates that a container should not be loaded onto said first rail when said first rail is in said container forwarding position.

* * * * *